Patented Dec. 5, 1950

2,533,015

UNITED STATES PATENT OFFICE 2,533,015

HERBICIDAL COMPOSITION

Leo Z. Jasion, Elizabeth, and Lawrence T. Eby, Roselle, N. J., assignors to Standard Oil Development Company, a corporation of Delaware No Drawing. Application August 26, 1948, Serial No. 46,374

5 Claims. (Cl. 71—2.4)

This invention relates to improved compositions for the control and destruction of weeds and more particularly to improved methods for the destruction of weeds through the use of the before-mentioned compositions.

It has now been found that compositions containing decyl acetoacetate as the active ingredient are extremely effective herbicides.

Decyl acetoacetate $CH_3COCH_2COOC_{10}H_{21}$ may be conveniently prepared by an ester exchange process, such as the reaction between n-decanol and ethyl acetoacetate in the presence of an alkali catalyst such as sodium metal or sodium methoxide. In a reaction of this kind the ethanol formed is conveniently removed by distillation. An entrainer such as benzene may be employed to facilitate removal of the ethanol by distillation. The decyl acetoacetate is then purified by washing with aqueous acetic acid to remove the alkaline catalyst. The product is dried and stripped of solvent and distilled in vacuo. The decyl acetoacetate boils at about 120–130° C./1 mm., and has a refractive index of $n_D^{20}=1.440$.

The compositions of this invention can be used to obtain contact or selective herbicidal activity depending upon the concentration of the active material employed. Higher concentrations give a contact activity or a killing of all top growth. By proper selection of the lower concentration many weeds may be killed without injuring the main crop at concentrations in the order of 0.2 to 1%.

The reason for the latter type of selective activity is not well understood but is believed to lie in the physiological resistance of many members of the grass and crop plant families to the compositions of this invention as distinguished by the lack of resistance to these compositions by many broad-leaved weeds.

The compositions of this invention may be adsorbed on a solid carrier such as clay, talc and bentonite and applied as a diluted dust. They may also be applied as a spray in a liquid carrier, either as a solution in a solvent or as a suspension in a non-solvent such as water. When applied as a spray in water, it may be desired to incorporate a wetting agent. Decyl acetoacetate can conveniently be put up in the form of emulsion concentrates consisting of the wetting agent and the active material.

Suitable solvents for decyl acetoacetate are, for example, petroleum naphtha, alcohols, ketones, ethers, etc.

The water-soluble wetting agents that may be used comprise the sulfates of long chain alcohols such as dodecanol up to octadecanol, sulfonated amide and ester derivatives, sulfonated aromatic and mixed alkyl-aryl sulfonate derivatives, esters of fatty acids such as ricinoleic acid ester of sorbitol, and petroleum sulfonates of $C_{10}$ to $C_{20}$ length. The non-ionic emulsifying agents such as the ethylene oxide condensation products of alkylated phenols may also be used. It is to be understood that these and similar compounds are intended when the term wetting agent is used hereafter.

Decyl acetoacetate may also be admixed with other herbicides such as, for example, cresols, carbamates, petroleum fractions, common salt and 2,4-dichlorophenoxyacetic acid.

This invention will be better understood by reference to the following examples of the use of the compositions of this invention for the purpose stated:

Example I

Decyl acetoacetate was dissolved in methanol to the extent of 0.2% by weight. This was sprayed on coleus (Coleus blumei) plants. After three days plants so treated showed very strong injury while control plants sprayed with methanol alone were uninjured.

Example II

Decyl acetoacetate was dissolved in methanol to give solutions of various percentages. These were sprayed on coleus plants with the following results:

|       | 24 Hrs.            | 5 days         |
|-------|--------------------|----------------|
| 5%    | Dead               | Dead.          |
| 2.5%  | ----do             | Do.            |
| 1.25% | ----do             | Do.            |
| .63%  | Very strong injury | Do.            |
| .32%  | Slight injury      | Slight injury. |
| .16%  | No injury          | No injury.     |

Example III

Aqueous emulsions of various concentrations were made with decyl acetoacetate. These were sprayed on coleus plants with the following results. (A petroleum sulfonate was used as emulsifying agent.)

|       | 24 Hrs.            | 5 days              |
|-------|--------------------|---------------------|
| 5%    | Dead               | Dead.               |
| 2.5%  | ----do             | Do.                 |
| 1.25% | ----do             | Do.                 |
| .63%  | Very strong injury | Do.                 |
| .32%  | ----do             | Do.                 |
| .16%  | Strong injury      | Very strong injury. |

It should be noted that the use of a wetting agent increased the activity of the compositions containing the lesser amounts of decyl acetoacetate.

It is to be understood that the invention is not limited to the specific examples which have been offered merely as illustration and that modification may be made within the scope of the appended claims without departing from the spirit of the invention.

What is claimed is:

1. A herbicidal composition comprising decyl acetoacetate as an active ingredient and a water carrier together with a wetting agent.

2. A herbicidal emulsion concentrate comprising decyl acetoacetate and a petroleum sulphonate having from 10 to 20 carbon atoms.

3. A herbicidal composition comprising decyl acetoacetate as the active ingredient admixed with a dispersing agent which lowers the surface tension of water and thereby promotes aqueous emulsions of decyl acetoacetate.

4. A herbicidal composition comprising decyl acetoacetate as the active ingredient admixed with a powdered clay.

5. A herbicidal emulsion concentrate composition comprising decyl acetoacetate admixed with a wetting agent selected from the group consisting of long-chain alcohol sulfates, sulfonated amide derivatives, sulfonated ester derivatives, sulfonated aromatic derivatives, sulfonated alkyl-aryl derivatives, and petroleum sulfonates of $C_{10}$ to $C_{20}$ length.

LEO Z. JASION.
LAWRENCE T. EBY.

REFERENCES CITED

The following references are of record in the file of this patent:

UNITED STATES PATENTS

| Number | Name | Date |
|---|---|---|
| 2,167,168 | Boese | July 25, 1939 |